E. JOHNSON.
POWDER DUSTING MACHINE.
APPLICATION FILED SEPT. 12, 1918.

1,282,697.

Patented Oct. 22, 1918.
3 SHEETS—SHEET 1.

Inventor
Elmer Johnson

UNITED STATES PATENT OFFICE.

ELMER JOHNSON, OF WASHINGTON, DISTRICT OF COLUMBIA.

POWDER-DUSTING MACHINE.

1,282,697.                    Specification of Letters Patent.       Patented Oct. 22, 1918.

Application filed September 12, 1918.   Serial No. 253,808.

(DEDICATED TO THE PUBLIC.)

*To all whom it may concern:*

Be it known that I, ELMER JOHNSON, a citizen of the United States, residing at Washington, in the District of Columbia, have invented certain new and useful Improvements in Powder-Dusting Machines, of which the following is a full, clear, and exact specification, such as will enable others skilled in the art to which it appertains to make and use the same.

This invention relates to powder dusting machines and particularly to machines for blowing insecticide in powdered form upon infested vegetation or soils.

This application is made under the act of March 3, 1883, chapter 143 (22 Stat. 625) and the invention herein described and claimed may be used by the Government of the United States or any of its officers or employees in the prosecution of work for the Government or by any other person in the United States without payment to me of any royalty thereon.

The principal object of this invention is to provide a powder dusting machine which will feed powder at a uniform rate and will positively prevent any tendency of the powder to clog in the feed lines.

Another object is to provide a reliable feeding mechanism which is adjustable to give any variation in feed desired from complete cut-off to a maximum of twenty pounds or more per acre in ten minutes.

A further object is to make use of the exhaust from the engine so as to aid the fan and to keep down the moisture content of the tubes, as well as to muffle the noise of said exhaust.

Other objects are to provide an improved type of nozzle to distribute the powder over a wide area and to further provide a chamber or box having means to regulate the amount of powder delivered to each nozzle.

For the better understanding of this invention the accompanying drawings have been provided, in which—

Figure 1:
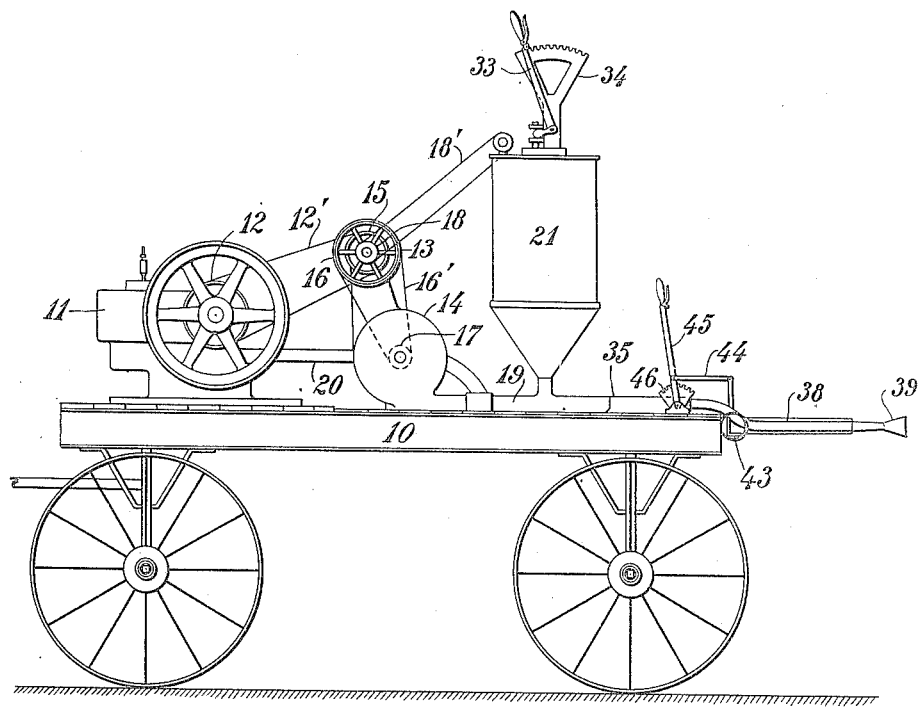
Figure 1 is a side elevation of a practical embodiment of the invention.

Referring specifically to these figures, it is seen that the numeral 10 designates the body of any ordinary type of wagon adapted to be drawn by draft animals. This wagon is to act only as a carrier and has no mechanical connection between its wheels and the blower whereby the latter is turned. Hence the wagon is easy to pull and imposes no tax on said animals. Instead of making the forward movement of the wagon run the blower, a gasolene or kerosene engine 11 is provided of the ordinary type which is connected to the blower fan 14. A pulley 12 on the engine is connected by a belt 12' to a smaller pulley 15 of a train of pulleys 13. On the same shaft with the pulley 15 is the much larger wheel 16 connected in turn by belting 16' to the small wheel 17 on the fan shaft. Thus the engine is given the leverage to rotate the fan 14 rapidly. The train of pulleys 13 includes also the small pulley 18 connected by a belt 18' to the stirring mechanism in the hopper as will be described.

The fan 14 is of any desirable type and is connected to the blast tube 19, running beneath a hopper 21. The exhaust from the motor 11 is led through a pipe 20 to the blast tube 19 and enters said tube at a point on the engine side of the hopper so that it reinforces the blast from the fan. A supporting framework holds the pulley train 13 and the hopper in place.

Figure 3:
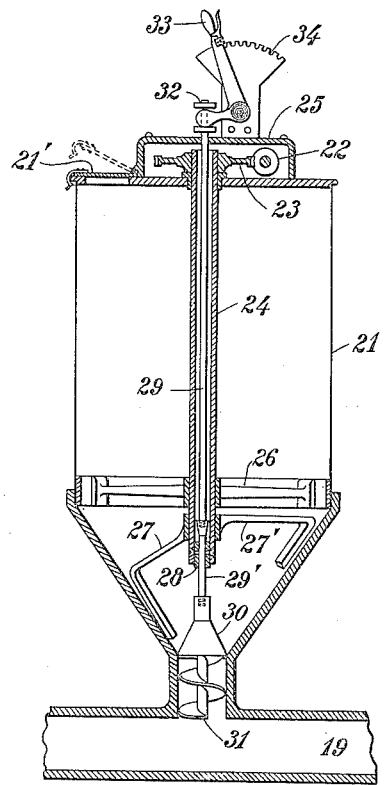
Fig. 3 is a detail vertical cross-section of the hopper showing the feeding mechanism

As Fig. 3 shows, the hopper 21 has a cover 21' over a hole in its top through which the supply of powder may be renewed from time to time. A worm gear 22 meshes with a wheel 23 and is rotated by a pulley 22' which the belt 18' drives. The worm gear and wheel are housed in a casing 25 on the top of the hopper to protect them from dust, etc. The wheel 23 is fixed to a hollow shaft 24 running down vertically through the center of the hopper and held in place by a bracket 26 near the lower end thereof. Also secured to the hollow shaft 24 at the lower end is a stirrer having stirring arms 27 and 27' which operate to keep the powder from sticking against the sides of the hopper. Thus it is seen that the engine not only drives the fan but turns the stirring apparatus.

Secured within the hollow shaft 24 is a rod 29 which also extends up through the casing 25 to a point without the hopper and has a head 32 at that end. A manually operable lever 33 is joined to said head in such a way that the rod can rotate. The lever 33 can be turned on a pivot set in a notched quadrant 34. At the lower end of the rod 29 screw threads are provided and a supplementary rod 29' is joined to the same. This supplementary rod 29' passes through a bushing or packing 28 provided in the lower end of the hollow shaft. The function of the bushing is to allow the rod 29 to be reciprocated by the adjusting lever 33 without allowing powder to get up inside the hollow shaft. At the same time the rod is normally forced to rotate with the hollow shaft. The bushing or packing is removable and may be taken out and renewed at will. The lower end of the supplementary rod is also screw-threaded and carries a cut-off valve 30 and an auger or screw-feeder 31 below the valve. Thus it is seen that movements of the hand lever 33 shift the position of the valve and the screw feeder. By raising the valve the feed is regulated to the desired quantity.

Figure 2:
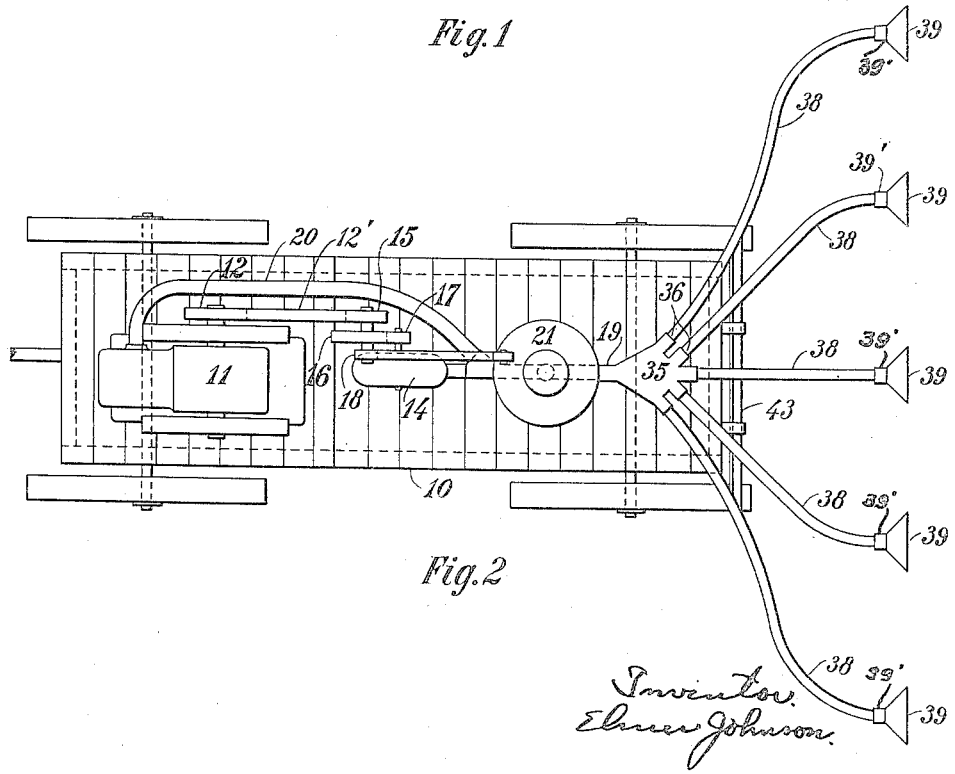
Fig. 2 is a plan view of the apparatus illustrated in Fig. 1.
Figure 4:
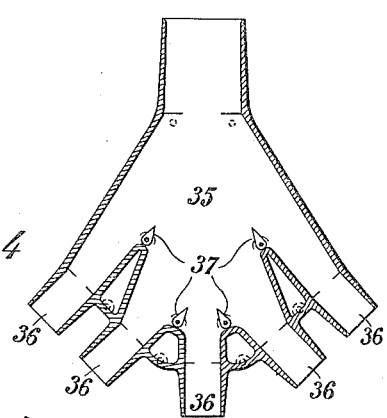
Fig. 4 is a horizontal longitudinal section of the distributing chamber.
Figure 7:
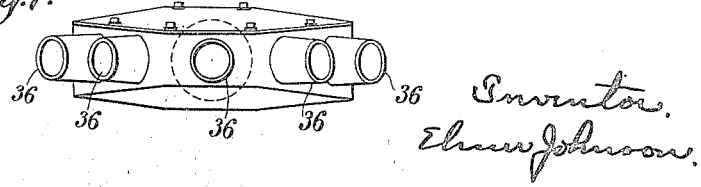
Fig. 7 is a front elevation of the distributing chamber.
Figure 5:
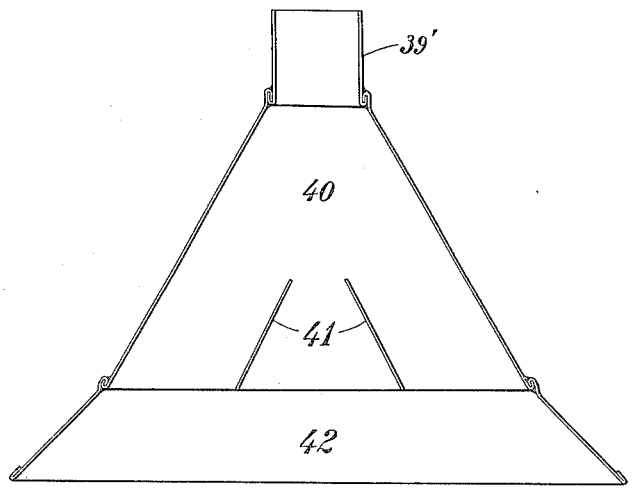
Fig. 5 is a horizontal longitudinal view of the nozzle.
Figure 6:
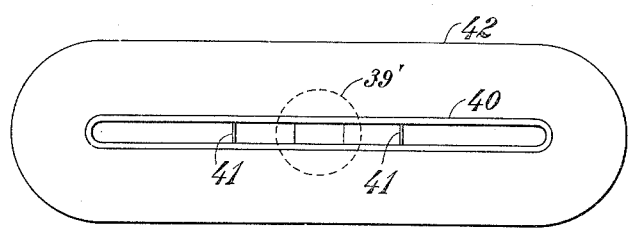
Fig. 6 is a vertical longitudinal view of the same.

On the opposite side of the hopper from the engine and connected to the tube 19 is a distributing chamber 35. This is preferably fan-shaped as Fig. 4 shows and is provided with a plurality of outlets 36. Gates or vanes 37 are set between each pair of outlets 36 to regulate the feed of powder to the same. It will be appreciated that the powder entering the distributing chamber 35 impelled by the fan blast and exhaust will tend to move in straight lines. Without these guide vanes 37 most of the powder would pass out through the central ones of the outlets. By turning these vanes, however, the powder flow can be so regulated that each outlet gets an equal share of the powder. The vanes 37 are held in their adjusted positions by any suitable mechanical means. Each outlet is connected in any suitable way to a hose 38, and the latter is provided at the other end with a nozzle 39. The hose lengths vary as Fig. 2 shows, so that a wide stretch of soil or vegetation may be treated by one passage of the machine.

Each nozzle, as Figs. 5 and 6 show, includes the straight pipe 39′ fitting into the hose, the fan-shaped section 40 with guide vanes 41, and the flaring lip 42. The use of the vanes or partitions 41 causes the powder to spread over a wide area, while the lip 42 prevents moisture from collecting at the narrow outlet of the nozzle where powder would quickly collect and soon clog up the same.

In order to vary the elevation of the nozzles, any convenient means may be employed. I have shown a light angle iron 43 secured to the wagon at its rear end and to each hose. A linkage 44 is secured to the angle iron and a hand lever 45 working over a quadrant 46 to the linkage 44 so that when the lever 45 is rocked forwardly the hose and nozzles are elevated, and when it is rocked rearwardly the nozzles are directed toward the earth.

The special feature of the present invention is believed to be the arrangement of the exhaust and fan. By piping the exhaust gases from the engine to the fan discharge pipe the hot gases keep the discharge line dry. Hence no damp powder will collect in the bends of the same. The pulsations due to the exhaust also act mechanically to aid the fan in forcing the powder through the nozzles. This is a considerable advantage as few fans have sufficient power to handle large quantities of powder. Moreover, the loud unpleasant noise incident upon the exhaust of an oil engine is almost completely done away with and the driver and team can work better as a consequence.

From the foregoing, it is thought that the construction, operation and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

What is claimed is—

1. In a machine of the class described, a hopper containing insecticide, a tube connected to said hopper, whereby the insecticide is fed into said tube, a blower fan having its blast directed through said tube and an engine driving said fan and exhausting into said tube.

2. In a machine of the class described, a hopper containing insecticide, a stirring and feeding mechanism in said hopper, a tube connected to said hopper whereby the insecticide is fed into said tube, a blower fan having its blast directed through said tube and an engine connected to said fan and said mechanism and exhausting into said tube.

3. In a machine of the class described, a hopper containing insecticide, a tube leading off from said hopper, a blower fan having its blast directed through said tube, and a liquid fuel driven engine driving said fan and exhausting into said tube in such a way that it acts as a booster to the fan and maintains the tube in a moisture-free state.

4. In a machine of the class described, a hopper containing insecticide and having an outlet, a stirring and feeding mechanism within said hopper, said mechanism comprising a power-driven hollow shaft carrying stirring arms, a rod reciprocable in and revoluble with said shaft, said rod carrying a valve and a screw feeder, the feeder being joined to the valve below the same, the valve controlling said outlet, and means for distributing the insecticide from said hopper.

In testimony whereof, I affix my signature in the presence of two subscribed witnesses:

ELMER JOHNSON.

Witnesses:
ARTHUR J. DECKER,
GUY K. MOTTER.